United States Patent Office 2,920,016
Patented Jan. 5, 1960

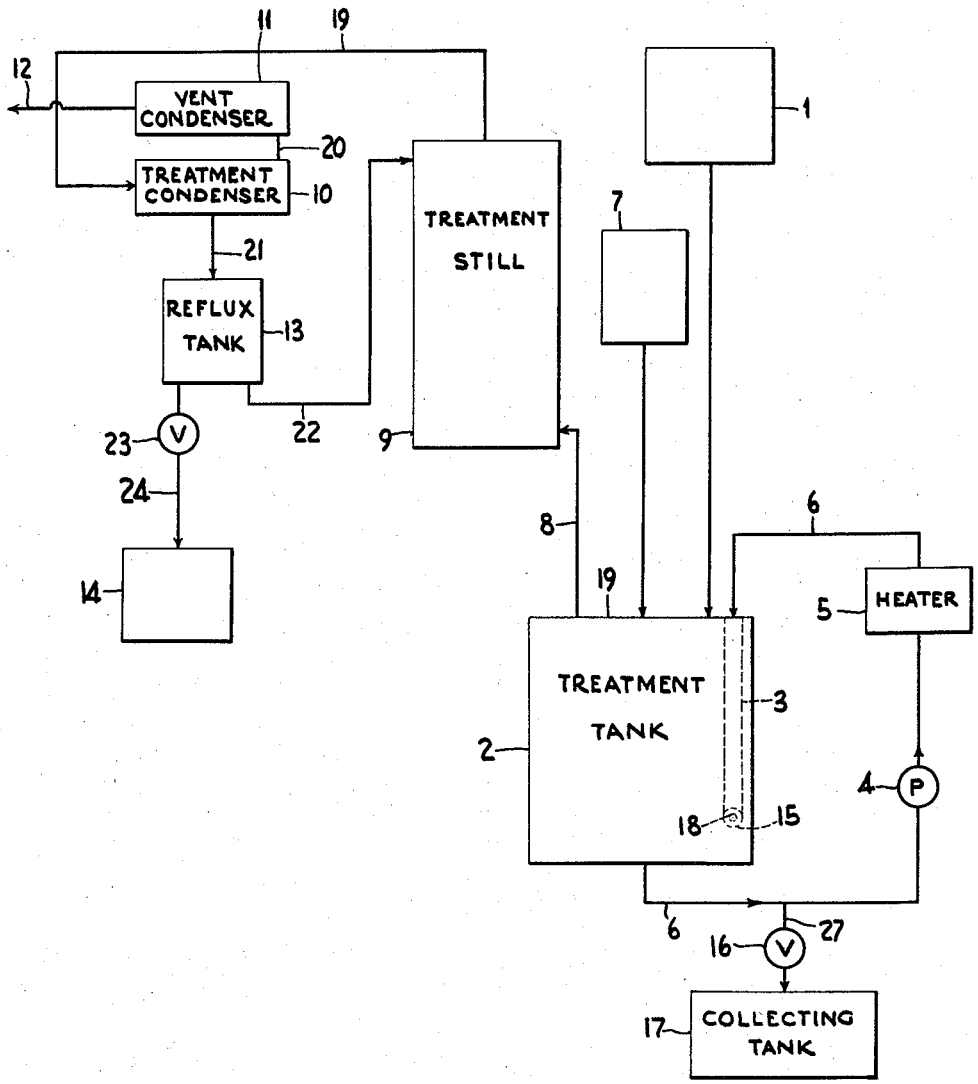

2,920,016

PURIFICATION OF TITANIUM TETRACHLORIDE

Philip E. Sharr, Sistersville, and Lester E. Bohl, New Martinsville, W. Va., assignors to Columbia-Southern Chemical Corporation Application April 30, 1957, Serial No. 656,043

4 Claims. (Cl. 202—57)

The present invention relates to the heating and purification of titanium tetrachloride.

Liquid titanium tetrachloride prepared by the chlorination of titaniferous ores usually contains a significant amount of vanadium impurities which the art has found difficult to remove. While it is known to add various organic purifying agents to titanium tetrachloride to react with the vanadium content and assist in the removal thereof, serious difficulty has been encountered when attempting to separate the resulting purifying-agent-vanadium complex or reaction product from the tetrachloride.

Among the many problems encountered probably the most common is that of further contamination of the crude titanium tetrachloride. For instance, removal of relatively-pure titanium tetrachloride from the crude mixture containing an organic purifying agent and vanadium by distillation very often, because of heating difficulties, gives rise to a high concentration of carbon in the titanium tetrachloride product. Furthermore, clogging continuously plagues the process and is occasioned by thixotropic complexes produced in the crude by the addition of carbonaceous reducing agents, such as high quality lubricating oils. Where these thixotropic materials are processed through conduits of relatively small diameters, for example, clogging is most prevalent and disrupts the operation.

Of tantamount importance, also, in view of the corrosive nature of titanium tetrachloride, is the desirability of proceeding cautiously in heating a pool thereof. Any slight rupture of the vessel containing the titanium tetrachloride could lead to serious consequences, particularly if the vessel walls are the media through which heat exchange between, say, steam and titanium tetrachloride takes place. As is well known, contamination of titanium tetrachloride with water not only disrupts the operation but creates a serious condition. Furthermore, the complexes formed by using carbonaceous reducing agents of the type contemplated herein, because of their thixotropic characteristics, are especially difficult to heat. For instance, as stated hereinabove, their tendency to set up in vessels or conduits of small diameter seriously hampers continuous flow therethrough and causes expensive shutdowns.

According to the present invention, however, the above difficulties have been overcome. In addition, numerous advantages which will be better understood from the description which is to follow are afforded by the instant invention.

The present invention provides a method of purifying liquid titanium tetrachloride containing vanadium as an impurity which comprises establishing a pool of the titanium tetrachloride containing a carbonaceous reducing agent and introducing a superheated stream of liquid titanium tetrachloride into the pool whereby the pool is agitated and heated by the incoming stream which vaporizes upon release into the pool. The heat given off by the resulting vapors heats the pool and causes distillation of titanium tetrachloride therefrom. The liquid stream released into the pool of liquid titanium tetrachloride, pursuant to a particularly desirable embodiment of the instant discovery, is first passed through a conduit disposed (immersed) in the pool, the conduit having a constricted outlet through which the superheated stream is discharged into the pool. As a result, the liquid stream is jetted into the pool and the heat given up by the vapors created boils the pool, thus distilling pure titanium tetrachloride therefrom.

According to a further specific embodiment of the present invention, a method is provided for purifying liquid titanium tetrachloride containing vanadium as an impurity which comprises establishing a pool of the titanium tetrachloride containing a carbonaceous reducing agent, such as a high grade lubricating oil, withdrawing a stream of the liquid from the pool, superheating the liquid stream and releasing it into the pool at a point below the upper surface thereof, whereby the pool is agitated and boils and titanium tetrachloride is distilled therefrom. As stated hereinabove, the stream may be fed into the pool via a constricted opening in a conduit submerged in the pool. The stream may be removed from the lower portion or bottom of the pool by pump action, passed through a heat exchange unit wherein it is heated above the boiling point by, for example, indirect heat exchange with "Dowtherm E" (treated ortho-dichlorobenzene specially stabilized for heat transfer purposes in the range of 148–260° C. and sold by Dow Chemical Company, Midland, Michigan), returned to the pool via a conduit which extends into the pool to a point below the upper level of the pool, and jetted into the body of liquid through a constricted outlet in the conduit.

Superheating is made possible by maintaining a back pressure on the liquid stream in the side arm, particularly while it is in the heat exchange unit or reboiler and in transit from the reboiler to the pool. Obviously, the constricted outlet creates a back pressure countering the forward pressure placed on the liquid stream by the pump delivering it to the reboiler. This countering pressure may be regulated as desired providing, however, that as a practical matter the back pressure does not overcome the forward pressure and providing, also, that sufficient back pressure is maintained to permit superheating of the stream. It follows necessarily that the degree of agitation of the pool is a function of the degree of constriction in the aforementioned conduit coupled with the forward pressure created by the pump. From these facts the versatility of the process of the instant discovery is readily discernible, because innumerable variations may be made in the pressures created in the side arm and, of course, the constriction in the outlet opening may vary considerably.

The instant discovery will be better understood upon reading the description to follow. However, while the description deals with specific details of certain embodiments of the invention, the scope of the invention is by no means limited thereto. It will be obvious to the skilled practitioner that numerous modifications are within the purview of the present invention.

As stated hereinabove, liquid titanium tetrachloride prepared by the chlorination of titaniferous ores, such as rutile or ilmenite, in the presence of carbon generally contains a significant amount of vanadium therein which is difficult to remove. For example, in the chlorination of a titaniferous-iron ore, such as rutile, containing at least 95 percent by weight $TiO_2$, basis the total weight of the ore, as high as about 2 percent by weight, generally about 0.6 percent by weight, vanadium, measured as $V_2O_5$, is present.

In the chlorination of this ore using a fluidized bed containing the ore and carbon and passing chlorine upwardly therethrough at temperatures from 700 to 950° C., exit gases from the reactor comprise titanium tetrachloride predominantly. Iron, zirconium, calcium, chromium and vanadium make up most of the impurities. When the gases leaving the reactor are condensed, titanium tetrachloride is liquefied and these impurities appear therein either in liquid or solid form. A major portion of these impurities may be removed by settling, such as in a Dorr settler, whereby a liquid upper phase predominantly of TiCl$_4$ results and a slurry containing solid impurities is formed as a lower phase.

While most of the impurities are removed by settling, the vanadium contamination remaining in the liquid titanium tetrachloride phase is generally present in sufficient quantity to require an additional step to remove it. As clearly pointed out hereinabove, the removal of vanadium has in the past been attended with significant difficulties.

According to the present invention, however, this clear liquid titanium tetrachloride containing from 0.10 to 0.88 percent by weight vanadium, measured as V$_2$O$_5$, generally about 0.25 percent, is treated with a carbonaceous reducing agent to react with the vanadium content of the tetrachloride, and the resulting reducing agent-vanadium complex or reaction product separated from the liquid titanium tetrachloride. Separation is brought about by heating a pool of the treated tetrachloride to effect distillation of relatively pure titanium tetrachloride, thus leaving the vanadium complex in the pool, i.e., in an undistilled fraction or heel.

According to the present invention, a particularly suitable embodiment comprises treating a pool of titanium tetrachloride with a carbonaceous reducing agent, withdrawing from the bottom of the pool a stream of the treated liquid titanium tetrachloride, introducing the stream into a heat exchange unit whereby the stream is heated above its boiling point, the resulting heated stream being returned to the pool and introduced therein. In this manner, the heated stream gives up its heat to the pool, thus causing the latter to boil and release vaporous titanium tetrachloride overhead. The relatively-pure titanium tetrachloride taken overhead is condensed and collected as product material.

The present invention will be better understood by referring to the flow sheet, Figure 1, wherein a particularly desirable embodiment of the invention is depicted.

Tank 1 in the drawing is any convenient size container used to store crude liquid TiCl$_4$ containing vanadium impurities. This crude is the liquid upper phase referred to hereinabove which is produced by settling the condenser reactor products in settlers (not shown).

Tank 2, herein referred to as a treatment tank, is preferably made of metal, such as iron or steel, and has outer walls insulated with glass, such as cellular glass or the like. Ceramic vessels or ceramic-insulated vessels are also contemplated herein. The size of the tank is governed by the volume of material it is desired to treat and, therefore, is limited only by practicality and convenience.

Treatment tank 2 has three (3) openings in the top thereof for the purpose of introducing (a) crude TiCl$_4$ from tank 1, (b) carbonaceous reducing agent or other treating agent from tank 7 and (c) a stream of TiCl$_4$ from conduit 6. A fourth opening in the top of treatment tank 2 leads into conduit 8 which feeds into treatment still 9 gaseous TiCl$_4$ emitted from treatment tank 2.

Treatment tank 2 has an opening in the bottom thereof in contact with side-arm conduit 6, generally a steel pipe, leading to pump 4 and heat exchanger 5. Leading from conduit 6 into collection tank 17 is conduit 27 which has a valve 16 therein. Periodically, as will be seen hereinafter, valve 16 is opened to permit flow of a portion of the pool into collection tank 17. This is the purging step which will subsequently be more thoroughly described.

Extending downwardly into tank 2 is pipe 3 which is open at each end and supported at its upper end by top 19 of tank 2. Pipe 3 is disposed laterally of the central, vertical axis of tank 2 and has an elbow 15 in its lower end causing the lower open end to point in a horizontal direction along the inner wall of tank 2, i.e., the material discharged from pipe 3 flows in a horizontal plane and at an angle to a vertical plane extending through the central, vertical axis of tank 2 and the tip of pipe 3. The opening 18 at the lower end is constricted by virtue of a gradual reduction of the internal diameter of pipe 3 toward said end.

Obviously, numerous modifications of pipe 3 and constricted opening 18 are contemplated herein and the scope of the invention is not limited to the embodiment shown in Figure 1. For instance, multiple pipes or a single pipe having multiple openings could be employed. It is not necessary that the pipe or pipes be laterally disposed as shown in the drawing, since pipes supported by the side walls of tank 2, extending horizontally across the tank and emptying into the body of liquid therein could be employed, for example.

Pump 4 may be any convenient size, commercial pump capable of circulating enough liquid to heater 5 to provide a steady stream of heated TiCl$_4$ to effect distillation of the pool.

Heating means 5 is preferably an indirect heat exchange unit comprising a closed vessel having a bank of spaced apart tubes therein through which a liquid stream of TiCl$_4$ is made to pass at a velocity of at least five (5) feet per second. The vessel preferably contains a heating medium, such as "Dowtherm E," in direct contact with the outer walls of these tubes to effect, by indirect heat exchange, heating of liquid TiCl$_4$ passing through the vessel via the tubes. The tubes are generally of small diameter, usually about one (1) inch.

The leg of conduit 6 leading from heater 5 to tank 2 feeds directly into pipe 3. The pressure on the stream running from heater 5 to the pool should be enough to overcome the countering pressures created by the pool itself and by the physical structure of pipe 3, i.e., its constricted or tapered end section. Since both the pump 4 and the heating means 5 function to create and control the velocity of this stream and, consequently, the degree of agitation imparted to the pool, the present invention provides a very effective means of handling thixotropic mixtures.

It is also a feature of the present invention that liquid TiCl$_4$ passing through heater 5 is heated to or slightly above its boiling point and, because of the curvature in pipe 3 and the constriction at its lower end, enough pressure is maintained on the heated liquid to prevent vaporization thereof. When this superheated liquid TiCl$_4$ enters the pool in treatment tank 2, which is at zero pressure gauge or under slight vacuum, the pressure is released and the TiCl$_4$ vaporizes instantaneously. By not vaporizing the TiCl$_4$ in heating means 5, the tendency for solid materials to deposit on the conduit walls is reduced. Furthermore, the continuous flow of liquid through these conduits conveniently flushes them, thus significantly minimizing any solid deposition.

Treatment tank 2 is connected via leg 8 to treatment still 9 which may be any conventional column, such as a plate or packed column. Treatment still 9 feeds into treatment condenser 10 via conduit 19. Condenser 10, in turn, is connected to vent condenser 11 through conduit 20. Exit conduit 12 leads from condenser 11 to the atmosphere or to any desirable collecting means (not shown). Vent condenser 11 is tilted slightly so that any material condensed therein flows into treatment condenser 10 through conduit 20.

Reflux tank 13 is connected to treatment condenser 10 by conduit 21. Two other conduits 22 and 24 lead from reflux tank 13, the former connecting with treatment still 9 and the latter connecting with product tank 14. Valve 23 in line 24 controls the amount of product refluxed, as will be seen hereinafter.

In operation, crude $TiCl_4$ is fed to treatment tank 2 from storage tank 1 and a stream of the pool withdrawn through line 6 by means of pump 4, valve 16 being adjusted to permit flow into collecting tank 17 only when desired. Liquid crude passes upwardly through line 6 to heat exchange unit 5, where it is heated and fed to treatment tank 2 via conduit 6 and pipe 3. When liquid $TiCl_4$ first appears in reflux tank 13, indicating the pool is at the desirable temperature, a pre-determined amount of carbonaceous reducing agent is dispensed from tank 7 to tank 2 while still circulating side arm stream through reboiler or heat exchange unit 5. Valve 23 of line 24 is closed to prevent flow to tank 14 and all product $TiCl_4$ refluxed until the carbonaceous purifying agent has fully reacted with the vanadium content of the $TiCl_4$ pool in treatment tank 2. Subsequently, valve 23 is adjusted to admit most of the product to storage tank 14, the remainder being refluxed to treatment still 9 as before.

The operation of the present invention will best be understood by the following example which, it will be understood, is not intended to unduly limit the scope of the invention, since a skilled chemical engineer will readily appreciate the numerous modifications which may be introduced without deviating from the invention.

*Example I*

Into a closed, vertical, metal (iron) tank 2 having a capacity of 108 tons is introduced from tank 1 seventy-five (75) tons of liquid crude $TiCl_4$. Tank 2 has an outside diameter of 14 feet, exclusive of an outer 2-inch surface insulation of cellular glass (i.e., a glass having a multitude of non-communicating comb cells and known as "Foamglas" which is sold by the Pittsburgh Corning Corporation, Pittsburgh 22, Pennsylvania). Tank 2 has a straight side height of 11 feet, 9 inches, has standard, dished heads and has a pipe 3 (8-inch diameter) extending from the top head and laterally-disposed of the central, vertical axis of the tank. Pipe 3 terminates at a point about 2.5 feet from the bottom of the tank 2.

The crude $TiCl_4$ contains about 99.7 percent by weight $TiCl_4$ and about 0.25 percent by weight vanadium, measured as $V_2O_5$. Pipe 3 has an elbow 15 at one end thereof, as shown in the drawing, which tapers to 6 inches in diameter, thus providing a constricted tip or opening 18 which serves to direct a $TiCl_4$ stream in a horizontal direction and at an angle to a vertical plane running through the central, vertical axis of tank 2 and the tip of pipe 3.

Having established a 75-ton pool of crude in tank 2, pump 4 is activated and draws a stream therefrom through conduit 6. That section of conduit 6 extending from the bottom of tank 2 to pump 4 is a pipe measuring 12 inches in diameter. The sections of conduit 6 constituting the remainder of the side arm are 8 inches in diameter. Pump 4 is operated at the rate of 2200 gallons of liquid $TiCl_4$ per minute.

Liquid $TiCl_4$ enters heater or reboiler 5 via the input end of conduit 6 and is removed via the output end of conduit 6. Heater 5 is a vertically-extended vessel comprising three (3) chambers, a lower chamber into which input conduit 6 feeds, an upper chamber from which output conduit 6 leads and a middle chamber. The middle chamber contains a bank of vertically-extended, spaced apart tubes of small diameter (about one inch) relative to 8-inch conduit 6, said tubes having ends inserted into manifold distributors comprising the end walls of the middle chamber, the side walls thereof corresponding to the vessel walls. Liquid $TiCl_4$ passes through the heater tubes at a velocity of about seven (7) feet per second.

The ends of the tubes are open and in communication with the upper and lower chambers, the middle chamber being otherwise sealed from the other chambers.

In the middle chamber, a body of heated "Dowtherm E" immerses the tubes and gives up its heat indirectly to the liquid $TiCl_4$ passing upwardly through the tubes, the "Dowtherm E" being maintained at a temperature of about 200° C. and causing the $TiCl_4$ to be heated above its boiling point. Vaporization does not take place, however, because of the pressure on the $TiCl_4$, occasioned by the curved and restricted lower end of pipe 3. The $TiCl_4$ vaporizes upon release of this pressure as it passes from pipe 3 into the pool of crude. The resulting vapors, of course, heat the pool.

While heating the pool in tank 2, low boilers, such as $COCl_2$, $CO_2$, CO, etc., are taken over and pass through still 9, through condensers 10 and 11 and conduit 12 where they are released as waste gases. During the warm-up operation, valve 23 in line 24 is closed to the passage of product from reflux tank 13 to product tank 14. The appearance of liquid $TiCl_4$ in the reflux tank 13, generally at a temperature of about 135° C., serves notice that the pool has reached the proper temperature. Immediately, 105 pounds of Talpa oil (a high grade lubricating oil sold by the Shell Oil Company, 50 West 50th Street, New York 20, New York), is dispensed from reservoir tank 7 into treatment tank 2, thus admixing the oil with the pool by means of the $TiCl_4$ vapor stream continuously being jetted into the pool through opening 18.

Refluxing is continued for three (3) hours, during which time the Talpa oil forms a thixotropic complex with the vanadium content of the pool. At the end of three (3) hours, valve 23 in line 24 is opened to admit product $TiCl_4$ to storage tank 14 at a controlled rate whereby the ratio of product refluxed to product collected is changed from 4:0 to 1:3. In other words, no product material is recovered for the first three hours, at the end of which time ⅔ of the product is collected and ⅓ refluxed.

This process is continued until 50 tons of product is collected, thus leaving 25 tons in the pool, at which point valve 23 is turned off to prevent flow to tank 14. Subsequently, valve 16 in line 27 is opened to permit removal of 5 tons of the 25-ton pool, the 5 tons of material being in the form of a thixotropic heel (containing about 5 to 25 percent by weight solids) which is collected in tank 17. Valve 16 is then shut to the flow of material to tank 17 and the entire system, in view of the fact that side arm heating is not interrupted at any time, is at the required temperature to permit the introduction of a 55-ton quantity of untreated material from tank 1 to make up another 75-ton pool of crude. The process is then repeated as just defined.

When using a carbonaceous reducing agent such as Talpa oil, generally at least about 0.5 pound of oil per pound of vanadium, measured as $V_2O_5$, preferably about 0.75 pound per pound of vanadium, is used to effect purification.

The 25-ton heel remaining in tank 2 after 50 tons has been boiled off contains about one (1) to three (3) percent by weight vanadium, measured as $V_2O_5$. The same also applies to the 5-ton quantity collected in tank 17.

Purified $TiCl_4$ collected in tank 14, according to the present invention, contains less than 0.007 percent by weight vanadium, measured as $V_2O_5$.

Although Talpa oil has been mentioned herein as a preferred purifying agent, other agents, such as mineral, animal or vegetable oils, hydrogen sulphide, soap, copper, etc., are contemplated herein.

While the present invention has been described in detail with respect to certain embodiments thereof, it is not intended that these details impose undue limitations upon the breadth of the invention, since numerous modifications are within the scope and spirit of the appended claims.

We claim:

1. A method of purifying liquid titanium tetrachloride containing vanadium as an impurity which comprises establishing a liquid pool of titanium tetrachloride containing a vanadium reaction product formed by adding a carbonaceous reducing agent to said pool; continuously withdrawing a liquid stream from the pool; heating said stream under pressure above the normal boiling point of titanium tetrachloride while maintaining said stream in an approximately completely liquefied state to prevent deposition of solid materials in said stream; jetting the resulting approximately completely liquefiied stream into the pool at a point below its upper level to release its pressure to heat said pool, and to viorgously agitate said pool to maintain said reaction product in a flowable state; and maintaining the rate of flow of said stream sufficiently high to render the reaction product in the stream flowable, and to effect distillation of substantially vanadium-free titanium tetrachloride from the pool.

2. The method of claim 1 wherein distillation is continued until the vanadium content of the pool is increased from an initial concentration of about 0.25 percent by weight to a final concentration of about 1 to 3 percent by weight, measured as $V_2O_5$.

3. The method of claim 1 wherein the carbonaceous reducing agent comprises a mineral oil.

4. The method of claim 1 wherein the superheated stream is jetted into the pool via a constricted opening in a conduit immersed in said pool.

References Cited in the file of this patent

UNITED STATES PATENTS

| | | |
|---|---|---|
| 1,997,980 | Smith | Apr. 16, 1935 |
| 2,412,349 | Meyers | Dec. 10, 1946 |
| 2,463,396 | Krchma | Mar. 1, 1949 |
| 2,543,591 | Nowicke | Feb. 27, 1951 |
| 2,722,506 | Ellis | Nov. 1, 1955 |
| 2,754,256 | Stambaugh | July 10, 1956 |
| 2,824,050 | Marcot et al. | Feb. 18, 1958 |